United States Patent
Murray

(10) Patent No.: US 9,302,820 B2
(45) Date of Patent: Apr. 5, 2016

(54) FLEXIBLE POUCH WITH NEAR FIELD COMMUNICATION

(71) Applicant: Pouch Pac Innovations, LLC, Sarasota, FL (US)

(72) Inventor: R. Charles Murray, Sarasota, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 0 days.

(21) Appl. No.: 14/303,757

(22) Filed: Jun. 13, 2014

(65) Prior Publication Data

US 2014/0367295 A1 Dec. 18, 2014

Related U.S. Application Data

(60) Provisional application No. 61/834,459, filed on Jun. 13, 2013.

(51) Int. Cl.

| | |
|---|---|
| *G06K 19/06* | (2006.01) |
| *B65D 33/00* | (2006.01) |
| *B65D 75/56* | (2006.01) |
| *B65D 75/58* | (2006.01) |
| *G06K 19/077* | (2006.01) |
| *B31B 1/00* | (2006.01) |

(52) U.S. Cl.
CPC ............ *B65D 33/004* (2013.01); *B31B 1/00* (2013.01); *B65D 33/00* (2013.01); *B65D 75/566* (2013.01); *B65D 75/5883* (2013.01); *G06K 19/07749* (2013.01); *B31B 2219/88* (2013.01); *B31B 2219/90* (2013.01); *B65D 2203/06* (2013.01); *B65D 2203/10* (2013.01)

(58) Field of Classification Search
CPC ........... G06K 19/07749; G07F 7/1008; B42D 15/10; G06Q 30/02
USPC ............................ 235/492, 487, 375; 705/41
See application file for complete search history.

(56) References Cited

U.S. PATENT DOCUMENTS

| | | | | |
|---|---|---|---|---|
| 7,965,184 | B1 * | 6/2011 | Nichols et al. | 340/568.7 |
| 8,577,802 | B1 * | 11/2013 | Nichols et al. | 705/41 |
| 2007/0106017 | A1 * | 5/2007 | Kessel et al. | 524/589 |
| 2014/0027752 | A1 * | 1/2014 | Fujimoto et al. | 257/40 |

* cited by examiner

*Primary Examiner* — Karl D Frech
(74) *Attorney, Agent, or Firm* — Dinsmore & Shohl LLP

(57) ABSTRACT

A flexible pouch having a printed wireless information tag thereon. The flexible pouch has a panel with at least one side seam, at least one inseam and a wireless information tag printed on the panel. The panel can have a foil layer included therewithin and an insulator layer between the panel and the wireless information tag. Also, the wireless information tag is printed with conductive ink.

11 Claims, 4 Drawing Sheets

FLEXIBLE POUCH WITH NEAR FIELD COMMUNICATION

CROSS-REFERENCE TO RELATED APPLICATIONS

This application claims priority of U.S. Provisional Application No. 61/834,459 filed Jun. 13, 2013, the contents of which are incorporated herein by reference.

FIELD OF THE INVENTION

The present invention is related to a flexible pouch, and in particular to a flexible pouch having near field communication capabilities.

BACKGROUND OF THE INVENTION

Flexible pouches are known for containing liquids, powder material, and the like. Such pouches are also known to have barcodes, quick response (QR) codes, and/or radio frequency identification (RFID) tags attached thereto such that information on the pouch and/or material contained within the pouch can be provided at a desired time. However, manufacturing of such types of pouches has heretofore required manufacturing of RFID tags separately from the flexible pouches and then attached thereto at a later time, which can result in delays in supplying the pouches to customers, changing of information between the time the pouch and/or RFID tags are produced and assembled, and the like. Therefore, a flexible pouch that is manufactured by printing of an RFID tag and/or near field communication (NFC) tag during production of the pouch itself would be desirable.

SUMMARY OF THE INVENTION

A flexible pouch having a wireless information tag printed thereon is provided. The flexible pouch has a panel with at least one side seam, at least one inseam and the wireless information tag printed onto panel. In some instances, an insulator layer, e.g. an insulator pad, is located between the panel and the information tag. For example, if the panel has a foil layer included therewithin, the insulator layer is located between the foil layer and the wireless information tag. It is appreciated that the insulator layer/pad provides for improved reception with respect to the printed wireless information tag.

The wireless information tag can be an RFID tag, an NFC tag, and the like that can received and/or transmit digital and/or analog information wirelessly. In addition, the wireless information tag has an antenna and the antenna is printed with conductive ink. Furthermore, the wireless tag may or may not have a microchip which may or may not be printed with conductive ink. The conductive ink can contain nanoparticles such as carbon nanoparticles, metal nanoparticles, and the like.

A process for manufacturing a flexible pouch is also provided, the process including providing flexible pouch sheet material and forming a flexible pouch panel from the sheet material. Thereafter, a wireless information tag is printed onto the flexible pouch panel. In some instances, the wireless information tag is printed onto the flexible pouch panel after manufacture of the flexible pouch is completed. In other instances, the wireless information tag is printed onto the flexible pouch panel before manufacture of the flexible pouch is completed.

The process can also include providing a flexible pouch manufacturing machine that manufactures flexible pouches. The wireless information tag can be printed onto the flexible pouch panel after manufacture of the flexible pouch is completed, but the flexible pouch is still on the flexible pouch manufacturing machine. In the alternative, the wireless information tag can be printed onto the flexible pouch panel after manufacture of the flexible pouch is completed and after the flexible pouch has been removed from the flexible pouch manufacturing machine. In still yet another alternative, the wireless information tag can be printed onto the flexible pouch panel during manufacture of the flexible pouch on the flexible pouch manufacturing machine. In addition, the flexible pouch manufacturing machine can place the insulator layer between the flexible pouch panel and the wireless information tag, as well as contain the wireless information tag printer that prints the antenna and/or microchip with conductive ink.

DETAILED DESCRIPTION OF THE PREFERRED EMBODIMENTS

The present invention provides a flexible pouch with an RFID tag or NFC tag thereon and a manufacturing process for the simultaneous fabrication of the pouch and the RFID or NFC tag thereon. Stated differently, an RFID tag or NFC tag is printed onto a pouch during the manufacturing process of the pouch.

The flexible pouch can be any flexible pouch known to those skilled in the art used for containing beverages, powders, and the like. Such types of pouches may or may not be made from a laminate material that has a foil layer, e.g. an aluminum foil layer. In the event that the flexible pouch does have a foil layer, an insulator can be located between the pouch and the RFID tag or NFC tag. In some instances, the RFID or NFC tag is printed with a three-dimensional (3D) printer that prints the antenna of the tag using a conductive ink. In addition, the conductive ink may or may not contain metal. For example, the conductive ink may only contain carbon (e.g. graphite) particles that can be subjected to a static charge during the printing and/or mixing process of the ink.

In the case of NFC tags being printed onto a flexible pouch, a semiconductor chip which is known to be in electronic communication with an antenna can also be printed with a 3D printer.

Figure 1:
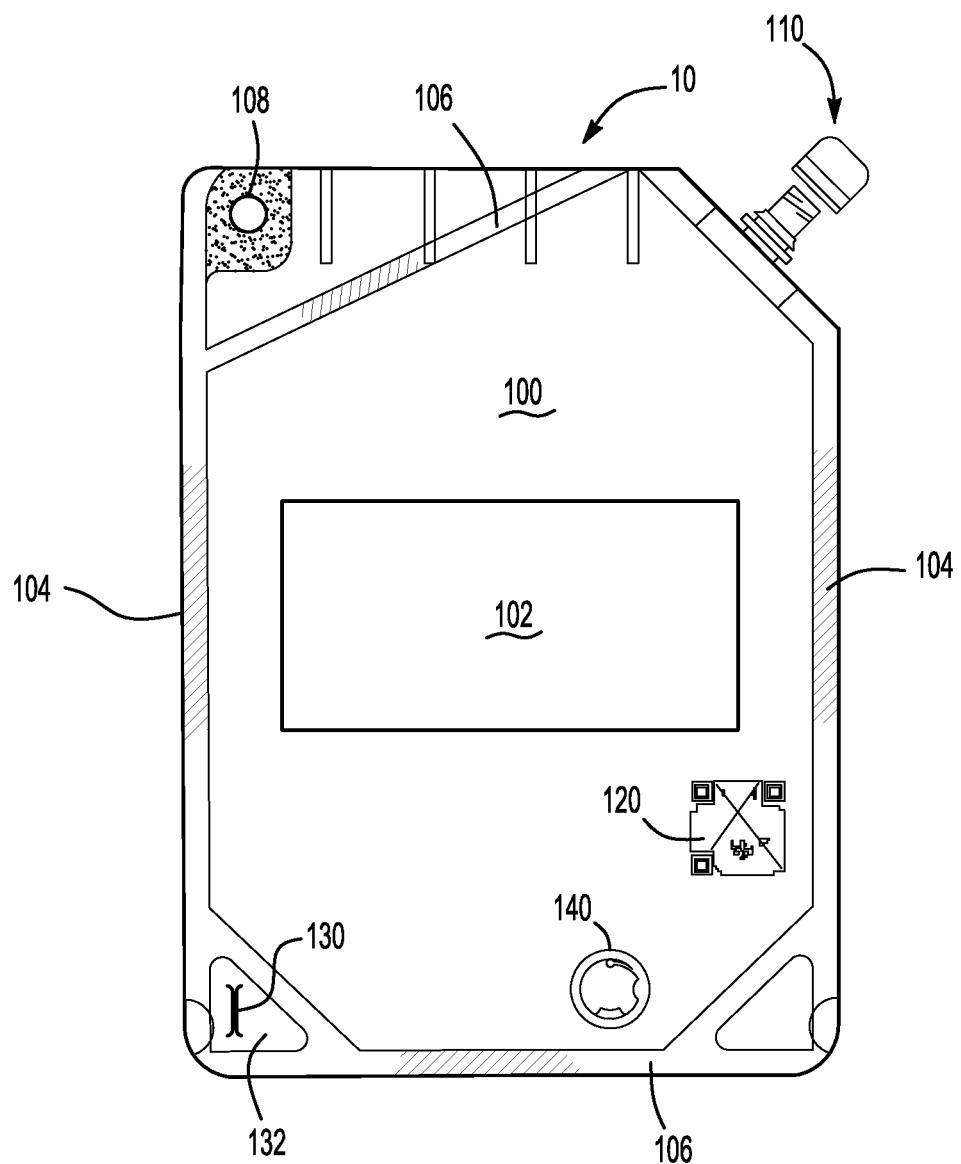
FIG. 1 is a schematic illustration of a flexible pouch with a wireless information tag.

Turning now to FIG. 1, an embodiment of a pouch according to an embodiment of the present invention is shown generally at reference numeral 10. The pouch 10 can have a side panel 100, at least one side seam 104, and one or more end seams 106. The pouch may or may not have a label 102, an aperture 108 for hanging the pouch, and/or a fitment 110 for removal of a product contained within the pouch 10.

The pouch 10 has a bar code (not shown), QR code 120, RFID tag 130 and/or NFC tag 140. The RFID tag 130 and/or NFC tag 140 can be attached to a surface of the pouch 10 and may or may not be laminated, i.e. be located between a side panel 100 and an overlying laminate layer. In the alternative, the RFID tag 130 and/or NFC tag 140 can be attached or printed to the side panel 100 using an adhesive or placed and located within the pouch 10. It is appreciated that the RFID tag 130 and/or NFC tag 140 can be located within an air pocket 132, the air pocket 132 affording better reception to and transmission from the RFID tag 130 and/or NFC tag 140.

In addition to the above, an antenna of the RFID tag 130 and/or NFC tag 140 is printed on the pouch 10 using an ink with nanoparticles. The shape of the antenna may or may not be in the form of a plurality of concentric circles as illustrated by the general shape of the NFC tag 140 in FIG. 1.

Figure 2:
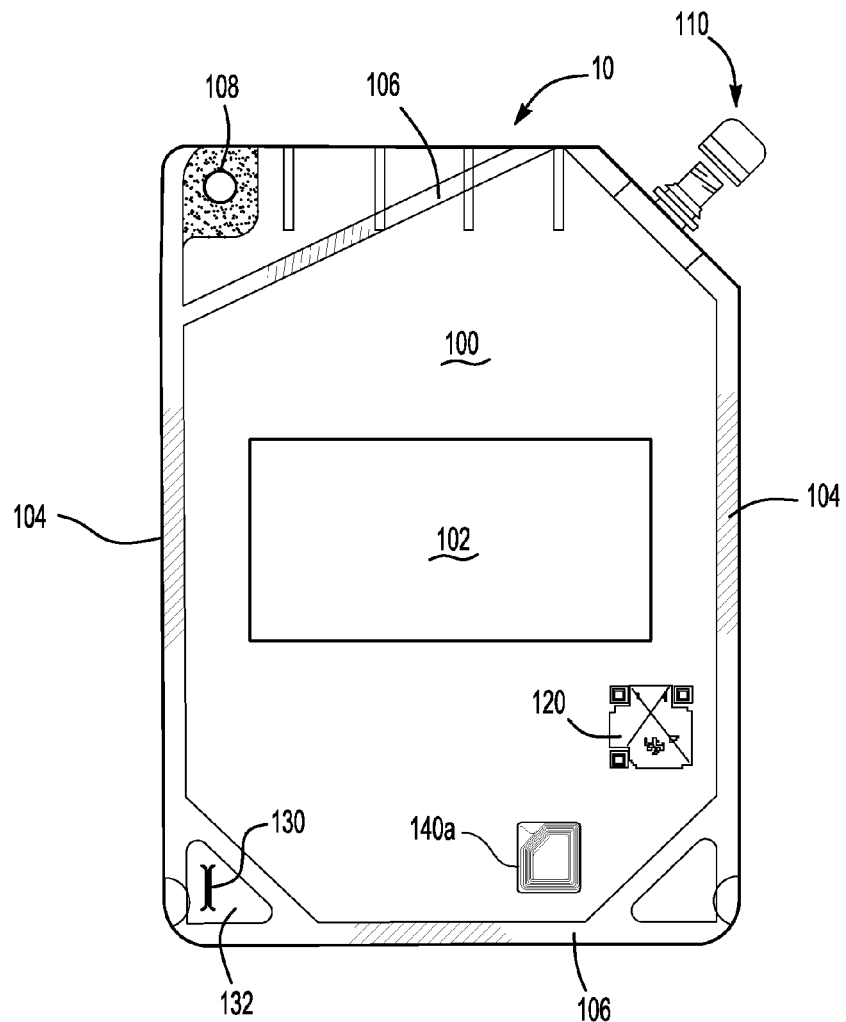
FIG. 2 is a schematic illustration of a flexible pouch with a wireless information tag.

Referring now to FIG. 2, the flexible pouch 10 shown in the figure is essentially identical to the flexible pouch shown in FIG. 1, except that the NFC tag 140 is replaced with a different type of NFC tag 140a.

In some instances, the side panel 100 of the flexible pouch 10 can be made from a laminate material. For example, the flexible pouch 10 can be formed of laminate sheets which provide a barrier against oxygen penetration and retain carbon dioxide within the pouch. In one embodiment, the laminate includes at least one layer of virgin polyethylene terephthalate (PET) and at least one layer of aluminum foil and another layer such as EVOH, PET or polyethylene. In a preferred embodiment, the laminate includes a metalized foil layer laminated to a cast polypropylene layer and another layer of PET, polyethylene or EVOH. It should be appreciated that there may be a fourth layer. In addition, the choice of layer material is driven by the product contained in the pouch 10.

In other instances, the side panel can have a laminate structure such as:

Pouch Body: PET 12μ/PRINT/AL 7μ/NY 15μ/LLDPE 75μ
and
Pouch Gusset: PET 12μ/PRINT/NY 15μ/LLDPE 60μ where the numeral represents the thickness of the layer in microns, PRINT represents a printed layer, AL represents aluminum or aluminum alloy layer, NY represents nylon layer and LLDPE represents linear low-density polyethylene layer. Is appreciated that the LLDPE thickness usually varies depending on the size of the pouch.

Figure 3:
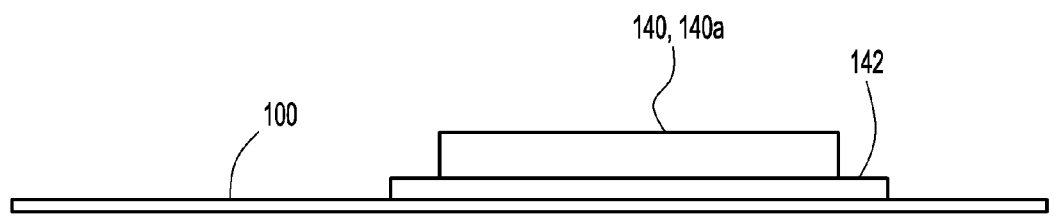
FIG. 3 is a schematic illustration of an insulator between a flexible pouch panel and a wireless information tag.

In instances where the side panel contains a foil layer, the pouch 10 can have an insulator or insulator pad 142 located between the side panel 100 and the NFC tag 140, 140a as shown in FIG. 3. It is appreciated that such an insulator or insulator pad 142 enhances near field communication between a portable electronic device (e.g. a cell and/or smart phone) and the NFC tag 140, 140a. Also, the insulator layer/pad can be made form any insulator material known to those skilled in the art, illustratively including rubber, paper, an insulating polymer, a flexible dielectric, and the like.

Figure 4:
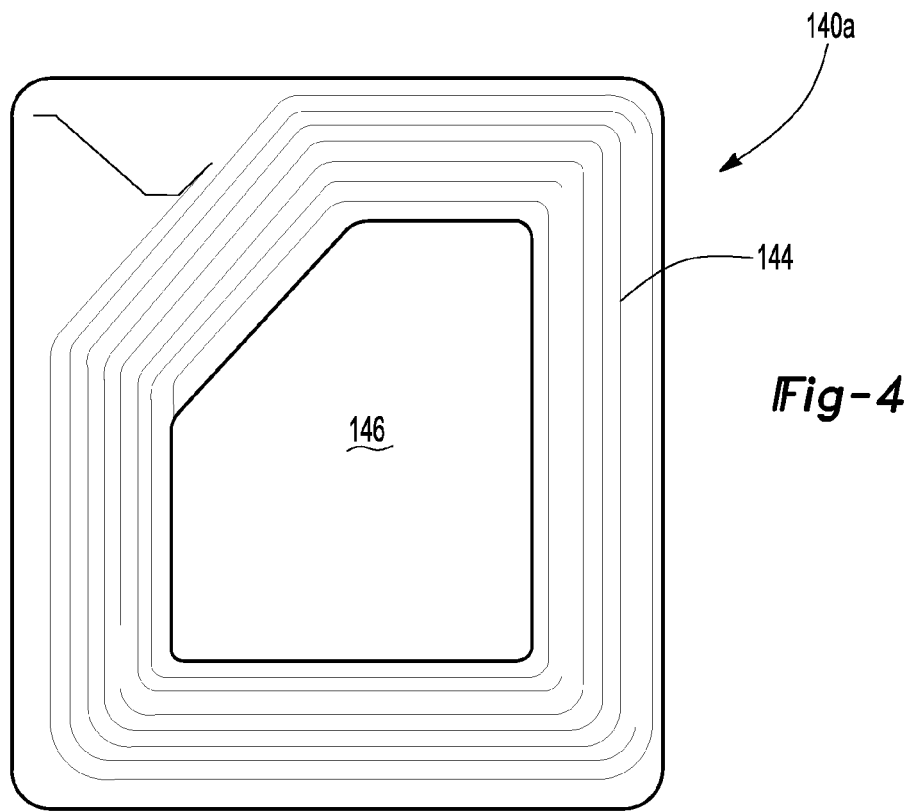
FIG. 4 is a schematic illustration of a wireless information tag.
Figure 5:
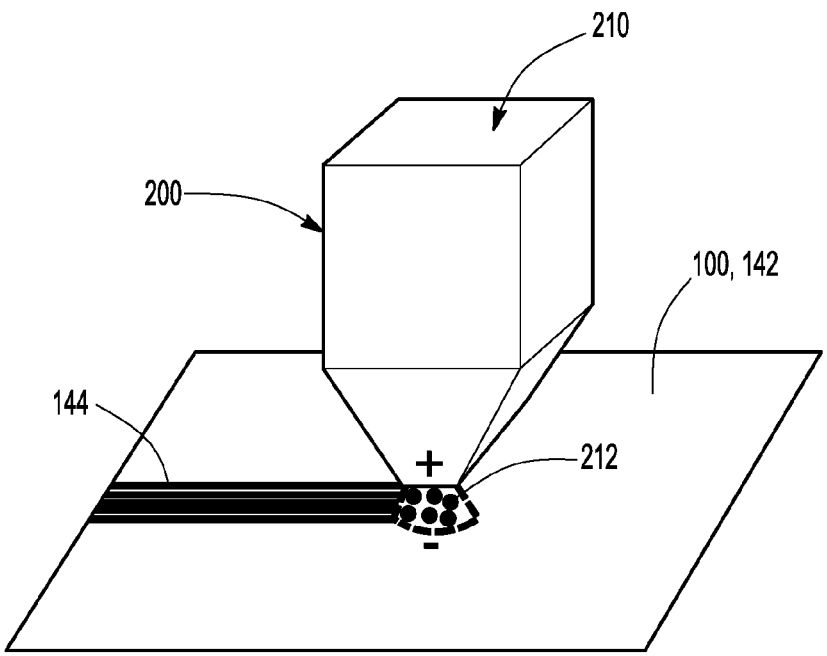
FIG. 5 is a schematic illustration of an antenna for a wireless information tag being printed with a conductive ink containing nanoparticles.
Figure 6:
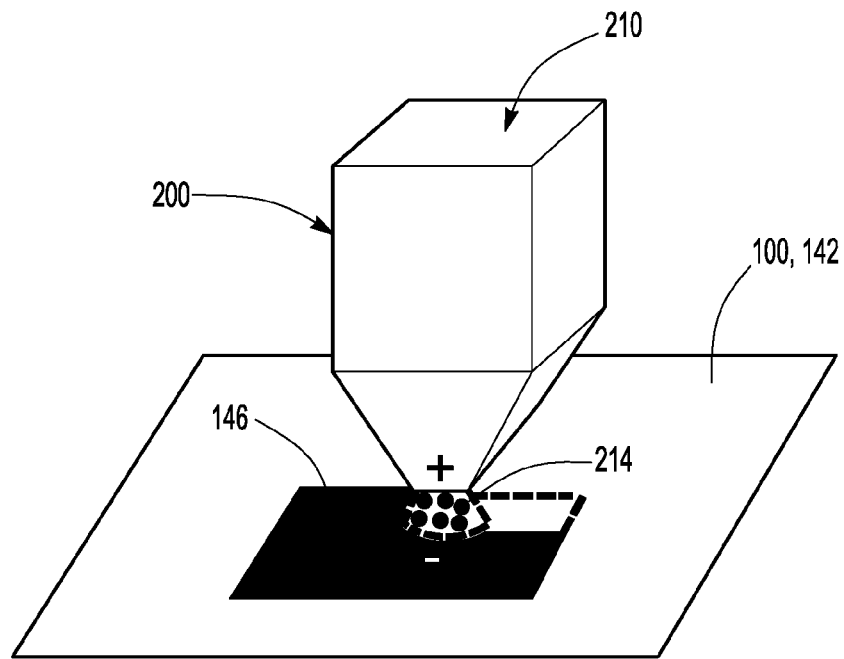
FIG. 6 is a schematic illustration of a microchip for a wireless information tag being printed using conductive ink with nanoparticles.

Referring to FIG. 4, an enlarged view of the NFC tag 140a is shown in which an antenna 144 is in electronic communication with a semiconductor chip 146 as is known to those skilled in the art. The NFC tag 140a can be printed onto the side panel 100 and/or insulator 142 as illustratively shown in FIGS. 5 and 6. In particular, a portion of the antenna 144 is shown being printed by a 3D printer 200 having an ink cartridge compartment 210 from which ink 212 is supplied. The ink 212 may or may not have metal particles, e.g. metal nanoparticles, which are deposited onto the side panel 100 and/or insulator 142 as is known to those skilled in the art of 3D printing. In the alternative, the ink 212 is not required to have metal particles but can include or be made from conductive particles such as graphite and the like. The graphite based ink 212 can have a static charge applied during the printing process as illustratively shown by the "+" and "−" signs shown in the figures. In this manner, the antenna 144 is made conductive and can operate to receive and/or send electromagnetic signals.

The semiconductor chip 146 can also be printed by the 3D printer 200 (FIG. 6) using an ink 214 which may or may not be the same as the ink 212 discussed above in FIG. 5. In addition, the semiconductor chip 146 can be programmed during and/or after its being printed onto the side panel 100 and/or insulator 142. In this manner, a 3D printer can print the entire NFC tag 140 or 140a on a flexible pouch side panel 100 and/or an insulator 142 during and/or shortly after the fabrication of a flexible pouch.

Figure 7:
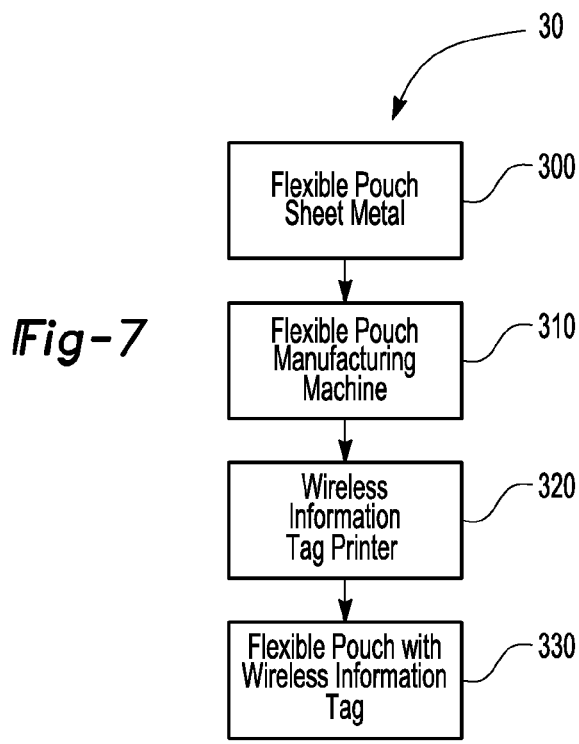
FIG. 7 is a schematic illustration of a process for producing a flexible pouch with a wireless information tag.

A process for manufacturing a flexible pouch with a wireless information tag is shown in FIG. 7 at reference numeral 30. The process 30 includes providing flexible pouch sheet material at step 300 and a flexible pouch manufacturing machine at step 310. In addition, a wireless information tag printer is provided at step 320. The flexible pouch manufacturing machine produces a flexible pouch panel from the flexible pouch sheet material and the wireless information tag printer prints a wireless information tag on the flexible pouch panel. In addition, the flexible pouch manufacturing machine produces a flexible pouch with the end result being a flexible pouch with a wireless information tag at step 330.

The wireless information tag can be printed by the printer during manufacture of the flexible pouch, or in the alternative after the flexible pouch has been completely manufactured. For example, a printer such as an expiry date printer known to those skilled in the art can be modified to print the wireless information tag at the same time that expiration date, batch information, etc. is printed onto the flexible pouch. In addition, data such as the expiration date, batch information, etc., can be programmed and/or coded into the wireless information tag. In any event, the wireless information tag printer may or may not be part of the flexible pouch manufacturing machine.

It should be appreciated that the examples and embodiments described above are for illustrative purposes only and that modifications, changes, and the like will be obvious to those skilled in the art and yet still fall within the scope of the invention. As such, it is the claims, and all equivalents thereof, that define the scope of the invention.

I claim:

1. A process for manufacturing a flexible pouch comprising:
   providing a flexible pouch manufacturing machine;
   providing a flexible pouch sheet material;
   forming a flexible pouch having a flexible pouch panel from the flexible pouch sheet material using the flexible manufacturing machine; and
   printing an NFC tag onto the flexible pouch panel while the flexible pouch is still on the flexible pouch manufacturing machine.

2. The process of claim 1, wherein the NFC tag is printed onto the flexible pouch panel after manufacture of the flexible pouch is completed.

3. The process of claim 1, wherein the NFC tag is printed onto the flexible pouch panel before manufacture of the flexible pouch is completed.

4. The process of claim 1, wherein the NFC tag is printed onto the flexible pouch panel during manufacture of the flexible pouch.

5. The process of claim 1, further comprising placing an insulator layer between the flexible pouch panel and the NFC tag.

6. The process of claim 5, wherein the flexible pouch panel has a foil layer and the insulator layer is an insulator pad.

7. The process of claim 1, wherein the NFC tag has an antenna and the antenna is printed with conductive ink.

8. The process of claim 7, wherein the NFC tag has a microchip and the microchip is printed with the conductive ink.

9. The process of claim 8, wherein the conductive ink contains nanoparticles selected from the group consisting of carbon nanoparticles and metal nanoparticles.

10. The process of claim 9, further including programming the microchip during printing.

11. The process of claim 9, further including programming the microchip after printing.

\* \* \* \* \*